(12) United States Patent
Tsuyuzaki et al.

(10) Patent No.: US 10,875,582 B2
(45) Date of Patent: Dec. 29, 2020

(54) VEHICLE BODY LOWER STRUCTURE

(71) Applicant: HONDA MOTOR CO., LTD., Tokyo (JP)

(72) Inventors: Takumi Tsuyuzaki, Wako (JP); Kazuya Kimura, Wako (JP); Takashi Nitta, Wako (JP); Takumi Enomoto, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/413,692

(22) Filed: May 16, 2019

(65) Prior Publication Data

US 2019/0359265 A1 Nov. 28, 2019

(30) Foreign Application Priority Data

May 25, 2018 (JP) .................................. 2018-100963

(51) Int. Cl.
*B60K 1/04* (2019.01)
*B62D 25/20* (2006.01)
(Continued)

(52) U.S. Cl.
CPC ............ *B62D 25/2036* (2013.01); *B60K 1/04* (2013.01); *B60R 13/0861* (2013.01);
(Continued)

(58) Field of Classification Search
CPC .......... B60K 11/04; B60K 11/08; B60K 1/00; B60K 1/04; B60K 11/02
See application file for complete search history.

(56) References Cited

U.S. PATENT DOCUMENTS

| 4,339,015 A * | 7/1982 | Fowkes ..................... B60K 1/04 |
| | | 180/65.1 |
| 7,549,660 B2 * | 6/2009 | Ramsey ................. B62D 21/02 |
| | | 180/209 |

(Continued)

FOREIGN PATENT DOCUMENTS

| CN | 101913380 | 12/2010 |
| CN | 206202421 | 5/2017 |

(Continued)

OTHER PUBLICATIONS

Japanese Notice of Allowance for Japanese Patent Application No. 2018-100963 dated Nov. 5, 2019.

(Continued)

*Primary Examiner* — John D Walters
*Assistant Examiner* — James J Triggs
(74) *Attorney, Agent, or Firm* — Amin, Turocy & Watson, LLP (57) ABSTRACT

A vehicle body lower structure includes a pair of left and right side sills, a battery pack and a bulkhead. The side sill is disposed below a side portion of a vehicle body and extends in a vehicle body forward/rearward direction. The battery pack accommodates a battery cell therein, and both end portions in a vehicle width direction are fixed to the left and right side sills while being disposed below a floor panel. The bulkhead is disposed inside of the side sills and reinforces a cross section of the side sills from inside. The bulkhead is provided at front and rear positions on the vehicle body and inside the side sills while having fixing points of the side sills to the battery pack sandwiched between the front and rear positions.

8 Claims, 10 Drawing Sheets

(51) Int. Cl.
  *B60R 13/08*    (2006.01)
  *B62D 25/02*    (2006.01)
(52) U.S. Cl.
  CPC .... *B62D 25/025* (2013.01); *B60K 2001/0416* (2013.01); *B60K 2001/0438* (2013.01)

(56) References Cited

U.S. PATENT DOCUMENTS

| | | | |
|---|---|---|---|
| 8,882,183 B2* | 11/2014 | Suzuki | B62D 25/04 296/203.01 |
| 2002/0053179 A1* | 5/2002 | Wycech | B29C 44/18 52/834 |
| 2012/0086238 A1* | 4/2012 | Tan | B62D 25/025 296/209 |
| 2014/0049033 A1* | 2/2014 | Yee | B62D 21/09 280/797 |
| 2018/0050607 A1* | 2/2018 | Matecki | B60K 1/04 |

FOREIGN PATENT DOCUMENTS

| | | |
|---|---|---|
| CN | 206344879 | 7/2017 |
| CN | 107640227 | 1/2018 |
| DE | 102014224545 | 6/2016 |
| JP | 06-115362 | 4/1994 |
| JP | 2013-028193 | 2/2013 |
| JP | 2017-193289 | 10/2017 |
| JP | 2017-226353 | 12/2017 |
| JP | 2018-034634 | 3/2018 |

OTHER PUBLICATIONS

Chinese Office Action for Chinese Patent Application No. 201910403970.9 dated Jul. 1, 2020.

\* cited by examiner

VEHICLE BODY LOWER STRUCTURE

CROSS-REFERENCE TO RELATED APPLICATION

Priority is claimed on Japanese Patent Application No. 2018-100963, filed May 25, 2018, the content of which is incorporated herein by reference.

BACKGROUND OF THE INVENTION

Field of the Invention

The present invention relates to a vehicle body lower structure in which a battery pack configured to accommodate a battery cell is disposed below a floor panel.

Description of Related Art

As a vehicle body lower structure, a structure in which a battery pack configured to accommodate a plurality of battery cells therein is disposed below a floor panel of a vehicle is known (for example, see Japanese Unexamined Patent Application, First Publication No. 2013-28193).

In the vehicle body lower structure disclosed in Japanese Unexamined Patent Application, First Publication No. 2013-28193, a pair of left and right side sills are disposed below a side portion of a vehicle body to extend substantially in a vehicle body forward/rearward direction, and the battery pack is fixed to the left and right side sills while being disposed below the floor panel.

SUMMARY OF THE INVENTION

However, in the vehicle body lower structure disclosed in Japanese Unexamined Patent Application, First Publication No. 2013-28193, since the battery pack that is a heavy article is fixed to side sills having a hollow structure, when the rigidity in the vicinity of fixing points of the side sills with respect to the battery pack is insufficient, there is a possibility that vehicle body vibration may occur due to vertical rocking of the battery pack.

An aspect of the present invention is directed to providing a vehicle body lower structure capable of minimizing vehicle body vibrations due to rocking of a battery pack.

In order to solve the above-mentioned problems, a vehicle body lower structure according to the present invention employs the following configurations.

(1) A vehicle body lower structure according to the present invention includes a pair of left and right side sills disposed below a side portion of a vehicle body and extending substantially in a vehicle body forward/rearward direction; a battery pack configured to accommodate a battery cell therein and having both end portions in a vehicle width direction fixed to the side sills while being disposed below a floor panel; and bulkheads disposed inside of the side sills and configured to reinforce a cross section of the side sills from inside, wherein the bulkheads are provided at front and rear positions on the vehicle body and inside the side sills while having fixing points of the side sills to the battery pack sandwiched between the front and rear positions.

According to the configuration of the above-mentioned (1), a cross section at the front and rear positions of the fixing points of the side sill to the battery pack is reinforced using the bulkhead. Accordingly, rigidity in front of and behind the fixing points of the side sills to the battery pack is increased by the bulkhead, and deformation of the side sills in the vicinity of the fixing points of the battery pack is suppressed.

In addition, according to the configuration of the above-mentioned (1), since both end portions of the battery pack in the vehicle width direction are supported by the side sills having high rigidity, rigidity of the vehicle body below the floor panel can be increased by the battery pack. For this reason, even in a vehicle in which a dedicated cross member cannot be easily installed below a floor panel, rigidity of the vehicle body below the floor panel can be increased.

(2) In the aspect of the above-mentioned (1), the bulkhead may be fixed to an inside of the side sill at least in an upward/downward direction.

In this case, since rigidity of the side sills in the vicinity of the fixing points to the battery pack in the upward/downward direction is increased, vertical vibrations of the battery pack that is a heavy article can be efficiently suppressed.

(3) In the aspect of the above-mentioned (1) or (2), a connecting member configured to connect a lower surface of the floor panel and a side surface of the side sill on an inner side in the vehicle width direction may be provided, and the fixing points of the side sill to the battery pack and the bulkhead may be disposed at positions on the connecting member on an outer side in the vehicle width direction.

In this case, the fixing points of the side sills to the battery pack are also reinforced by the connecting member together with the bulkhead disposed in front of and behind the fixing points. Accordingly, rigidity around the fixing points of the side sills to the battery pack is increased. Accordingly, when an impact load is input to the side sill from an outer side in the vehicle width direction, a load can be efficiently transmitted to the floor panel side via the bulkhead and the connecting member while suppressing deformation of the cross section of the side sills.

(4) In the aspect of any one of the above-mentioned (1) to (3), a stiffener configured to partition the inside of the side sill into a closed space on an inner side in the vehicle width direction and a closed space on an outer side in the vehicle width direction and reinforce them may be disposed in the side sills, and the bulkhead and the fixing points may be disposed in an inner closed space partitioned by the stiffener on an inner side of the side sills.

In this case, since surroundings of the fixing points of the side sills to the battery pack are reinforced by a stiffener and the bulkhead, rigidity in the vicinity of the fixing points is further increased. Accordingly, when the configuration is employed, vibrations of the vehicle body can be further suppressed.

(5) In the aspect of the above-mentioned (4), an outer bulkhead configured to reinforce an outer closed space from inside may be disposed in the outer closed space partitioned by the stiffener on an inner side of the side sill.

In this case, since the outer closed space partitioned by the stiffener on an inner side of the side sill is reinforced by the outer bulkhead, rigidity in the vicinity of the fixing points is further increased.

(6) In the aspect of the above-mentioned (5), the outer bulkheads may be provided at front and rear positions on the vehicle body and inside the outer closed space while having the fixing points sandwiched between the front and rear positions.

In this case, front and rear positions of the fixing points are reinforced by the bulkhead in the inner closed space and also reinforced by the outer bulkhead in the outer closed space. Accordingly, when the configuration is employed, rigidity in front of and behind the fixing points of the side sills can be further increased, and deformation in the vicinity of the fixing points of the side sills can be further suppressed.

According to the aspect of the present invention, since the bulkheads are provided at front and rear positions on the vehicle body and inside the side sills while having the fixing points of the side sills to the battery pack sandwiched between the front and rear positions, vibrations of the vehicle body due to rocking of the battery pack can be suppressed.

DETAILED DESCRIPTION OF THE INVENTION

Hereinafter, an embodiment of the present invention will be described with reference to the accompanying drawings. In the drawings, an arrow FR indicates a forward direction with respect to a vehicle, an arrow UP indicates an upward direction with respect to the vehicle, and an arrow LH indicates a leftward direction with respect to the vehicle.

Figure 1:
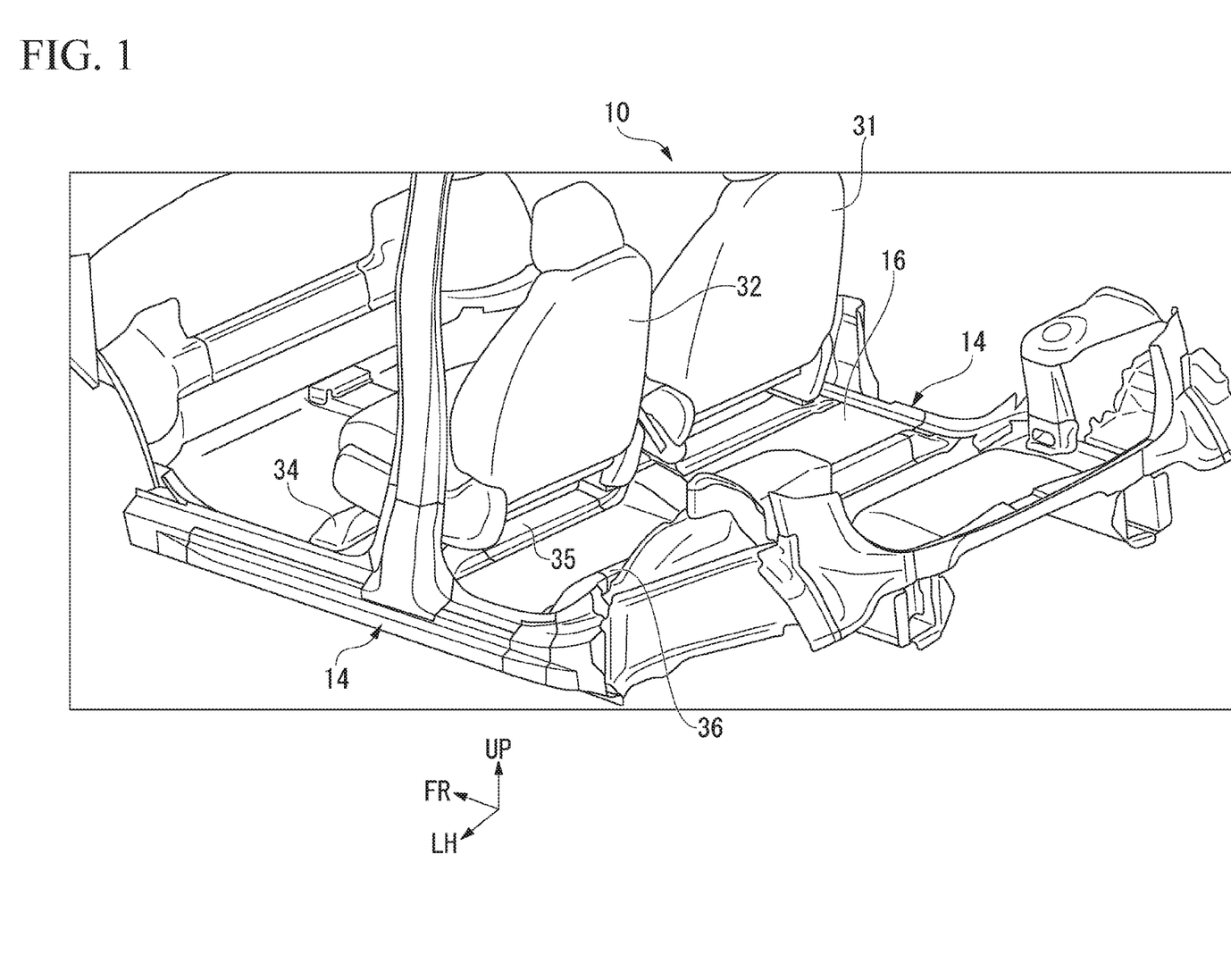
FIG. 1 is a perspective view showing a skeleton section of a vehicle according to an embodiment of the present invention.
Figure 2:
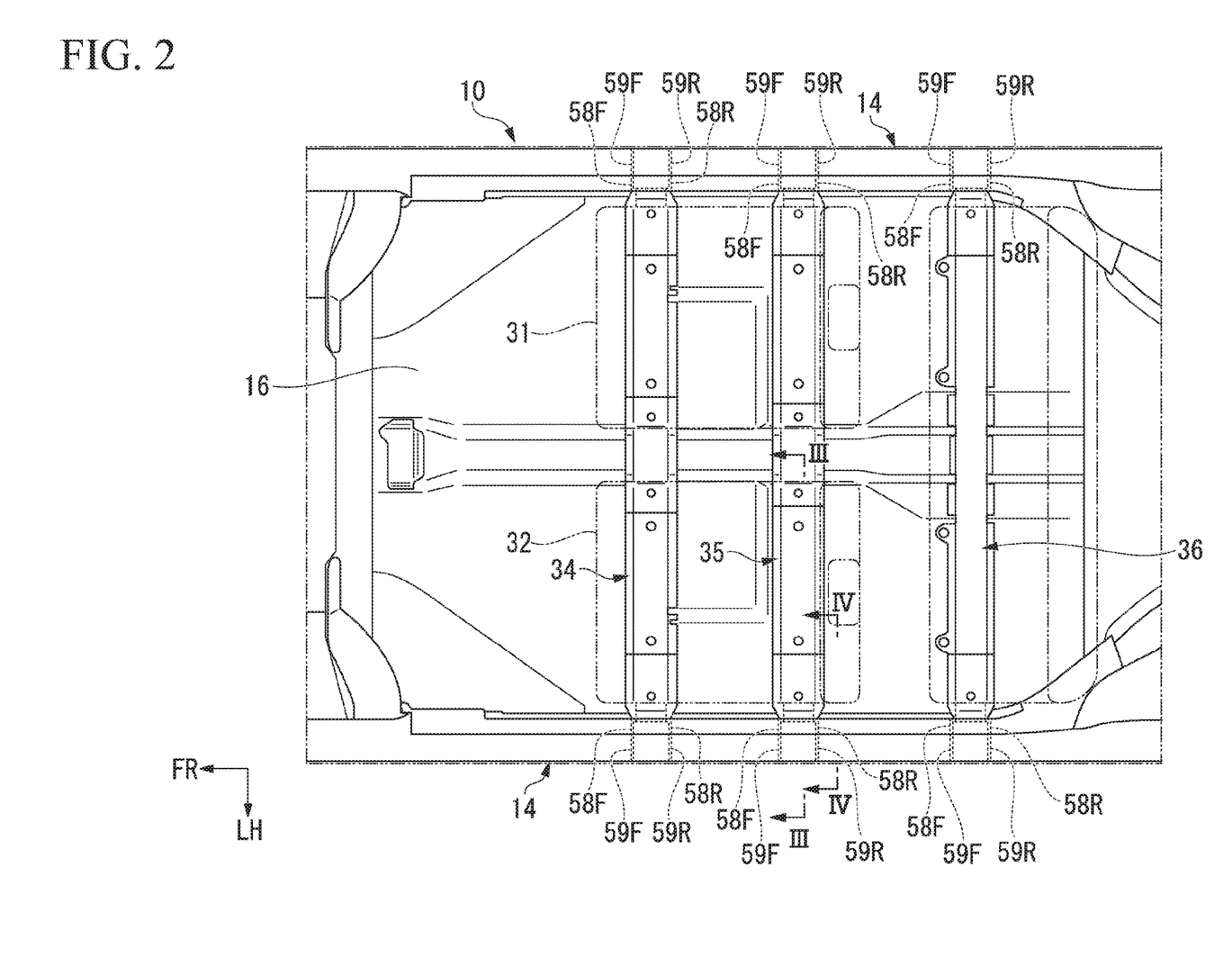
FIG. 2 is a plan view showing a vehicle body lower structure of the embodiment of the present invention.
Figure 3:
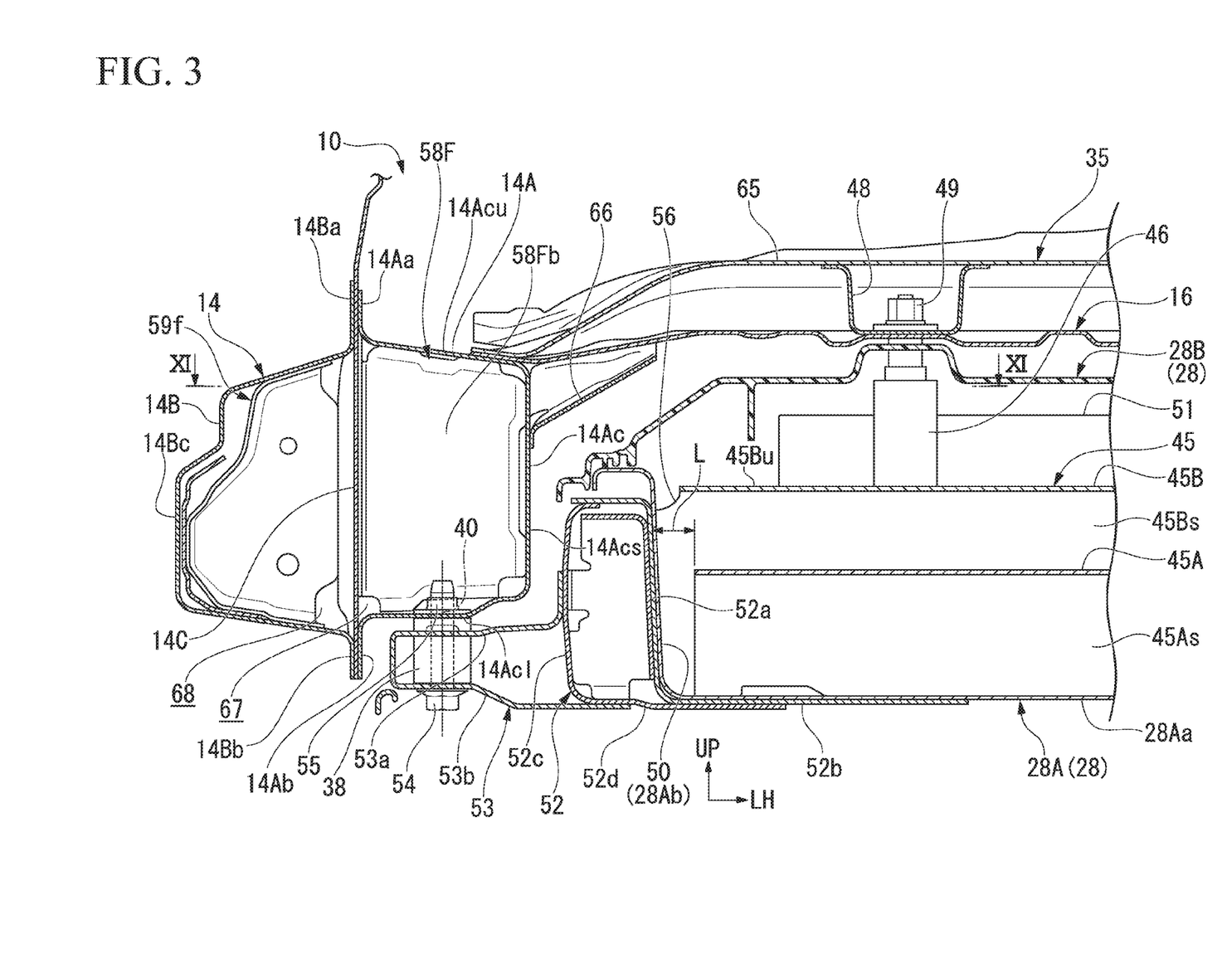
FIG. 3 is a cross-sectional view of the vehicle body lower structure of the embodiment of the present invention taken along line in FIG. 2.
Figure 4:
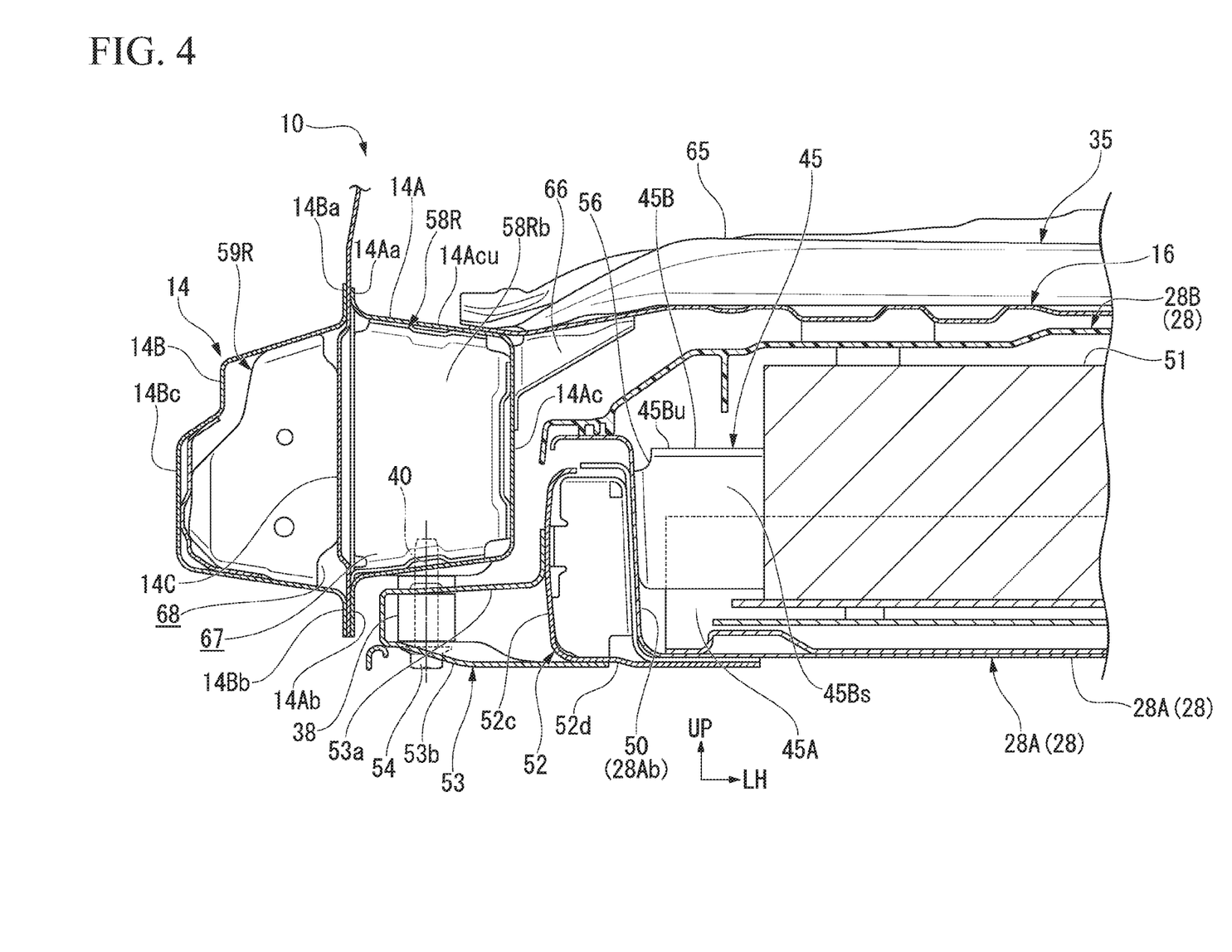
FIG. 4 is a cross-sectional view of the vehicle body lower structure of the embodiment of the present invention taken along line IV-IV in FIG. 2.

FIG. 1 is a view showing a skeleton section of a vehicle 10 of the embodiment from obliquely above a rear left side, and FIG. 2 is a view showing a vehicle body lower structure of the vehicle 10 of the embodiment from above. In addition, FIG. 3 is a cross-sectional view of the vehicle body lower structure in FIG. 2 taken along line and FIG. 4 is a cross-sectional view of the vehicle body lower structure in FIG. 2 taken along line IV-IV.

The vehicle body lower structure of the embodiment includes a pair of left and right side sills 14, which are strengthening members disposed at lower end side portions of the vehicle. The left and right side sills 14 extend substantially in a forward/rearward direction of the vehicle body.

The vehicle body lower structure of the embodiment includes the pair of side sills 14, a floor panel 16 having two end portions in a vehicle width direction that bridge between the left and right side sills 14, a plurality of floor cross members 34, 35 and 36 having main parts disposed on an upper surface side of the floor panel 16, a battery pack 28 (see FIG. 3 and FIG. 4) between the left and right side sills 14 below the floor panel 16, and a plurality of battery cross members 45 installed in the battery pack 28. In the case of the embodiment, a driver seat 31 installed in a passenger compartment and installation sections in front of and behind a passenger seat 32 are attached to the two front floor cross members 34 and 35.

All of the floor cross members 34, 35 and 36 extend substantially in the vehicle width direction, lower ends thereof are joined to an upper surface of the floor panel 16, and both end portions in an extension direction are coupled to the left and right side sills 14. The floor cross members 34, 35 and 36 are disposed to be separated in the vehicle body forward/rearward direction.

Figure 5:
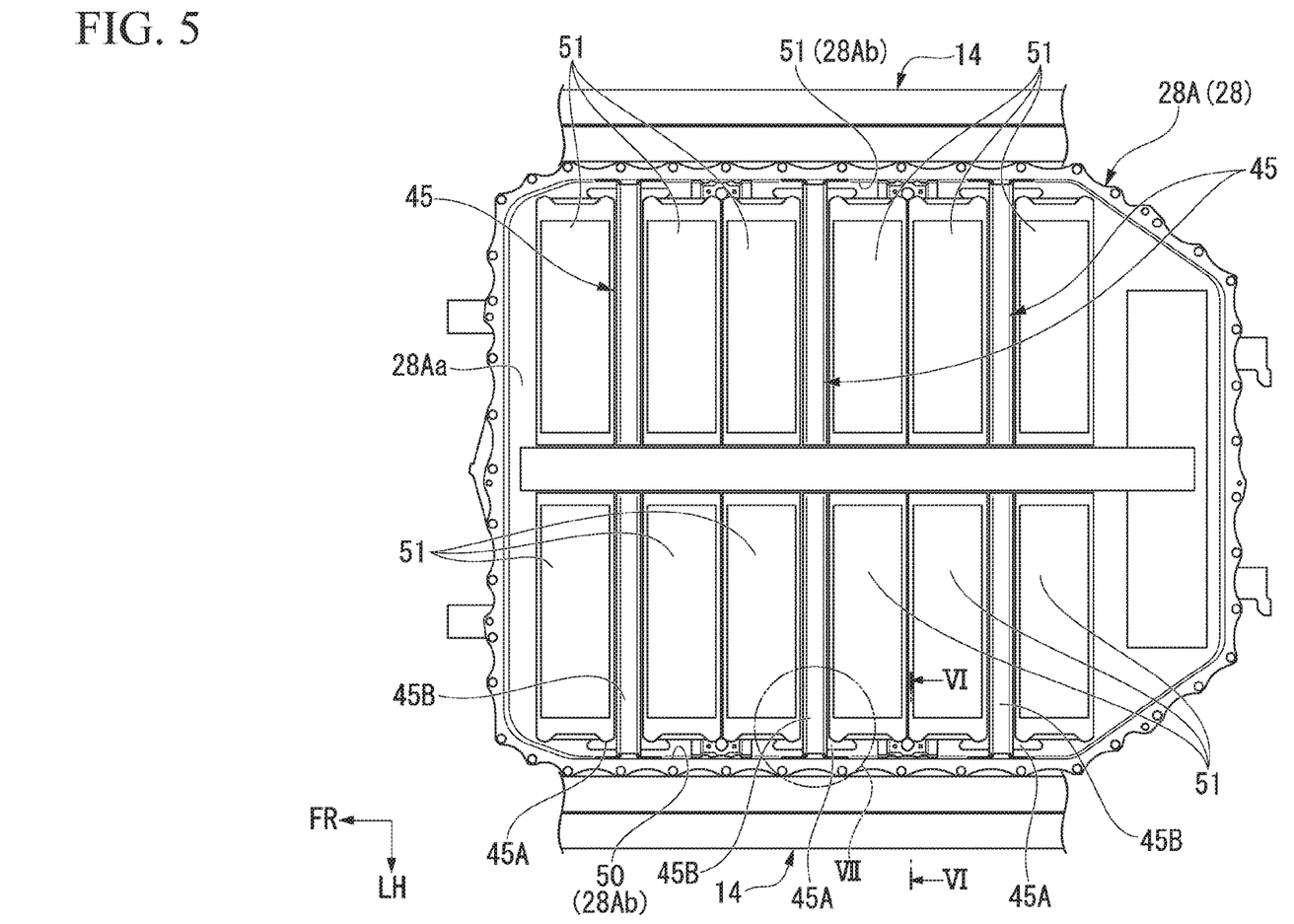
FIG. 5 is a plan view in which a floor panel of the vehicle body lower structure and a pack cover of a battery pack according to the embodiment of the present invention are removed.
Figure 6:
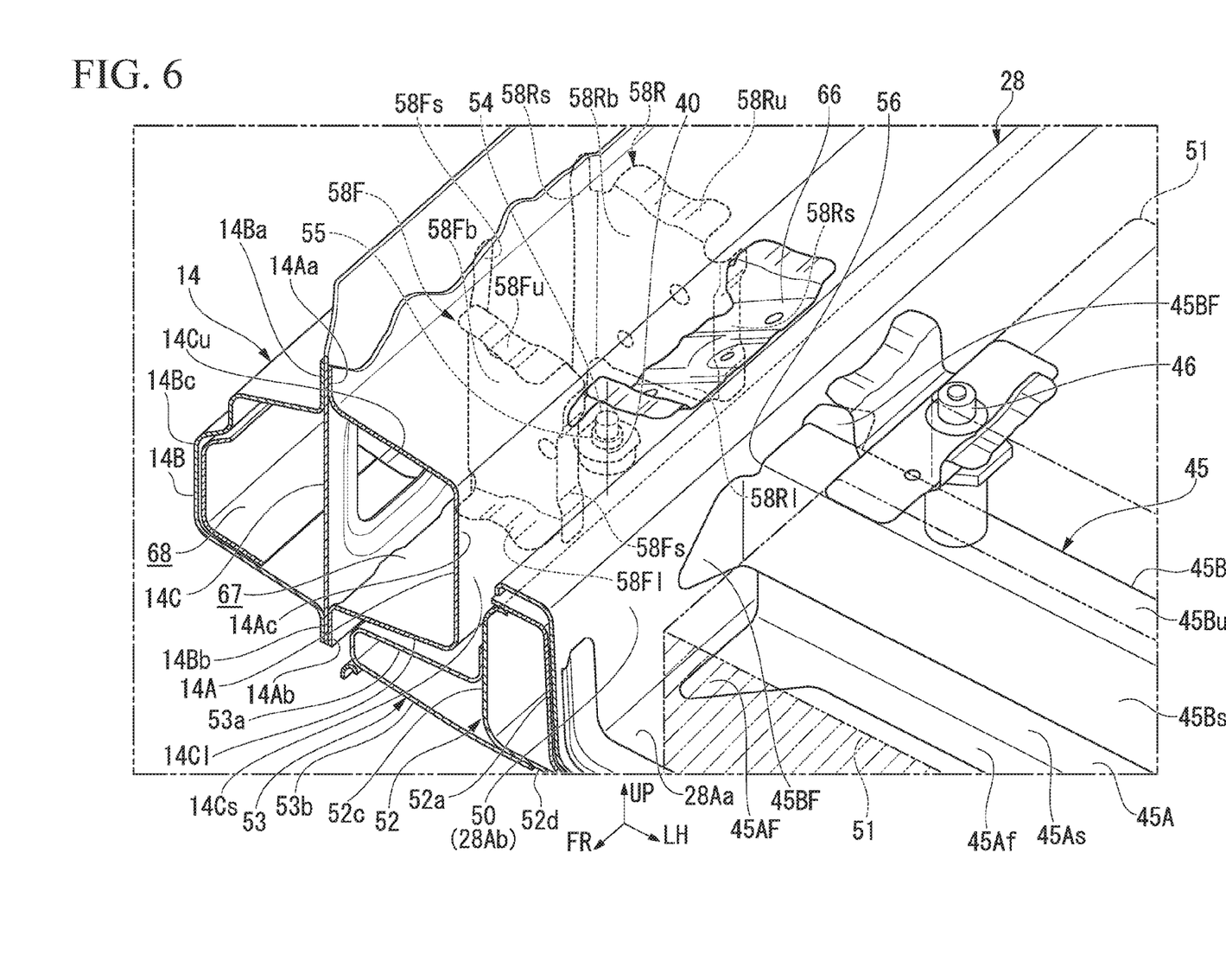
FIG. 6 is a partial cross-sectional perspective view of a cross-sectional portion of the vehicle body lower structure according to the embodiment of the present invention taken along line VI-VI in FIG. 5.
Figure 7:
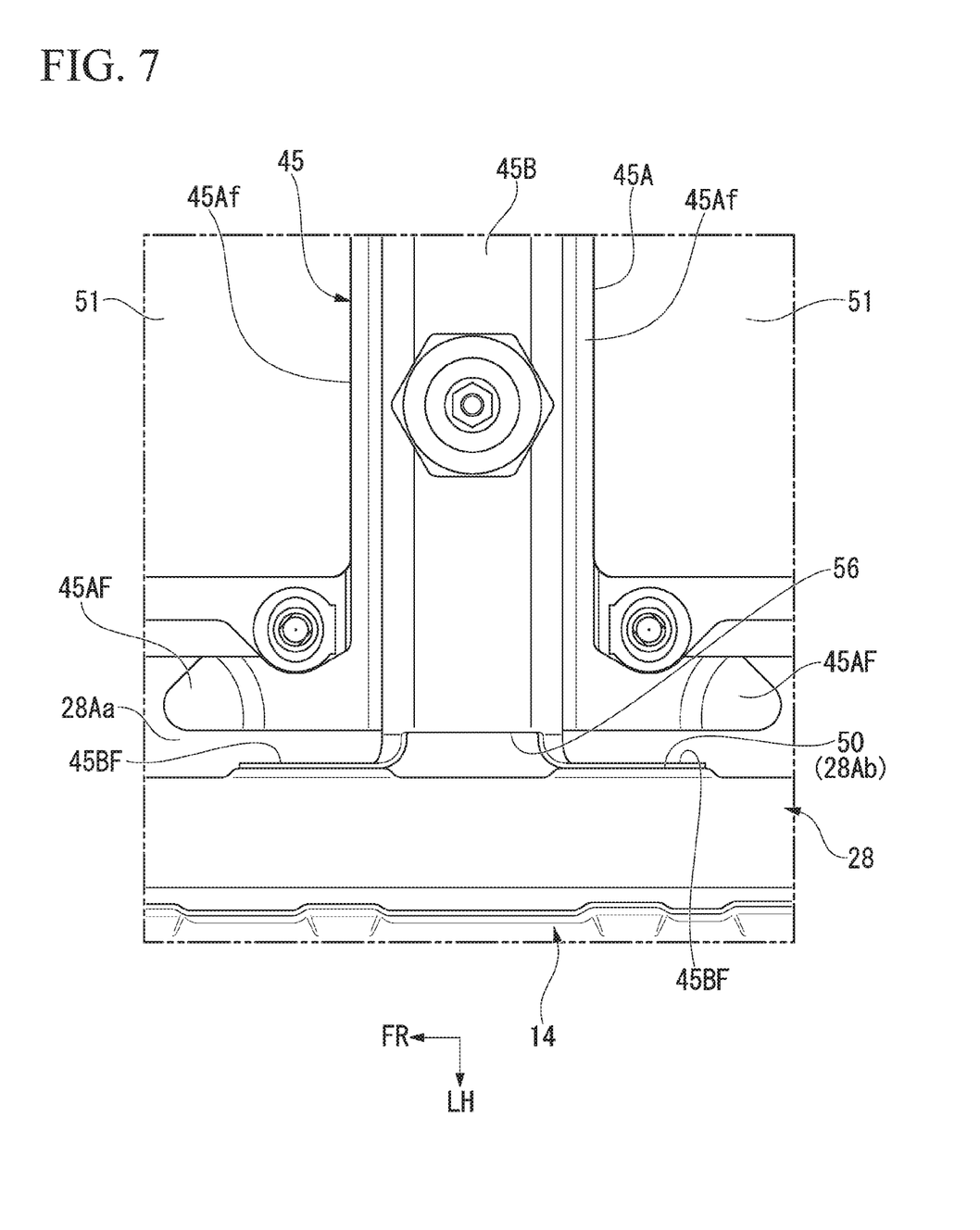
FIG. 7 is an enlarged plan view of a portion VII in FIG. 5 of the vehicle body lower structure according to the embodiment of the present invention.

FIG. 5 is a view showing the vehicle body lower structure, from which the floor panel 16, a pack cover 28B of the battery pack 28, or the like, is removed, from above. FIG. 6 is a partial cross-sectional perspective view of the vehicle body lower structure shown in FIG. 5 taken along line VI-VI, and FIG. 7 is an enlarged view showing a portion VII in FIG. 5.

The battery pack 28 includes a pack main body 28A that opens upward, and the pack cover 28B that closes an opening of an upper section of the pack main body 28A. The pack main body 28A includes a bottom wall 28Aa formed in a substantially rectangular shape when seen in a plan view, and a circumferential wall 28Ab standing upright from a circumferential region of the bottom wall 28Aa. Portions of the circumferential wall 28Ab standing upright from left and right side end portions are referred to as sidewalls 50.

A plurality of battery cells 51 and the plurality of battery cross members 45 extending substantially in the vehicle width direction to partition the inside of the battery pack 28 into front and rear parts are disposed in the battery pack 28. In the case of the embodiment, three battery cross members 45 are provided. The battery cross members 45 are disposed immediately below the floor cross members 34, 35 and 36 above the floor panel 16, respectively. The three floor cross members 34, 35 and 36 and the battery cross members 45 are disposed substantially parallel to each other.

Cross sections including the battery cross members 45 corresponding to the floor cross members 34, 35 and 36, respectively, (cross sections substantially perpendicular to the forward/rearward direction of the vehicle) have substantially the same structure. For this reason, as described below, a cross-sectional structure of a lower section of the vehicle body will be described with reference to representative cross sections including the floor cross-member 35 at a center in the forward/rearward direction and the battery cross members 45 therebelow.

As shown in FIG. 3, FIG. 4 and FIG. 6, a prismatic side frame 52 extending substantially in the vehicle body forward/rearward direction is coupled to outer surfaces of the sidewalls 50 of the pack main body 28A. The side frame 52 is formed in a longitudinal rectangular cross-sectional shape having a vertical height slightly smaller than that of the pack main body 28A.

The side frame 52 has an inside sidewall 52a joined to the sidewalls 50 of the pack main body 28A and having a lower end bent toward an inner side in the vehicle width direction, and an extension piece 52b provided at a tip of a bent section thereof. The extension piece 52b overlaps a lower surface of the bottom wall 28Aa of the pack main body 28A and is joined to the lower surface of the bottom wall 28Aa. In addition, a bottom wall 52d connected to a sidewall 52c of the side frame 52 on an outer side extends until a lower surface of the extension piece 52b, and is joined to the bottom wall 28Aa of the pack main body 28A together with the extension piece 52b through welding or the like.

In addition, an attachment frame 53 protruding outward from a lower region of the side frame 52 in the vehicle width direction is coupled to an outer side of the side frame 52 in the vehicle width direction. The attachment frame 53 forms a lateral rectangular cross section together with a sidewall of the side frame 52 on an outer side while coupled to the side frame 52. The rectangular cross section extends substantially in the vehicle body forward/rearward direction. In the attachment frame 53, an end portion of an upper wall 53a at an inner side in the vehicle width direction is bent upward to be joined to the sidewall 52c of the side frame 52 at an outer side, and a lower wall 53b extends until below the bottom wall 52d of the side frame 52 to be joined to the lower surface of the bottom wall 52d.

The attachment frame 53 overlaps inner lower surfaces of the left and right side sills 14, and is coupled to lower walls of the side sills 14 by a bolt 54 and a nut 55 that are fastening members. The bolt 54 passes vertically through the lower wall 53b and the upper wall 53a of the attachment frame 53, and a tip portion thereof is screwed to the nut 55 fixed in the side sill 14. Further, a collar 38 through which a shaft section of the bolt 54 is inserted is disposed in the attachment frame 53. The collar 38 increases rigidity of a bolt fastening section of the attachment frame 53 by disposing the collar 38 inside the attachment frame 53. The fastening section constituted by the bolt 54 and the nut 55 constitute fixing points 40 with the battery pack 28 in the side sills 14.

As shown in FIG. 3, upper walls of the battery cross members 45 are coupled to the floor panel 16 and the upper-side floor cross member 35 by a stud bolt 46 that is a fastening member.

Specifically, a bracket 48 having a substantially C-shaped cross section is joined to a lower surface of an upper wall of the floor cross member 35, and a screw section of an upper section of the stud bolt 46 passes upward through the floor panel 16 and the bracket 48. Then, a nut 49 is fastened to the screw section passing upward through the bracket 48. Further, the pack cover 28B configured to cover the pack main body 28A from above is locked to the stud bolt 46.

Here, the floor cross member 35 includes a cross plate 65 joined to an upper surface of the floor panel 16 and forming a closed cross section extending substantially in the vehicle width direction between the floor panel 16 and the cross plate 65, and a gusset plate 66 that bridges between a lower surface of an end region of the floor panel 16 in the vehicle width direction and the inner surfaces of the side sills 14 and forms a closed cross section extending substantially in the vehicle width direction between the floor panel 16 and the gusset plate 66. The cross plate 65 has a cross section formed in substantially a hat shape, and both end portions in the vehicle width direction are joined to upper surfaces of the left and right side sills 14 together with the floor panel 16. The gusset plate 66 has a cross section formed in a substantially downward hat shape, and both end portions in the vehicle width direction are joined to a lower surface of the floor panel 16 and side surfaces of the side sills 14 on an inner side in the vehicle width direction (side surface of a sidewall 14Acs). In the embodiment, the gusset plate 66 constitutes a connecting member configured to connect the floor panel 16 and the side surfaces of the side sills 14 on an inner side in the vehicle width direction.

An upper wall of an end region of the cross plate 65 in the vehicle width direction is inclined downward toward an outer side in the vehicle width direction. Accordingly, in the closed cross section formed by the cross plate 65 and the upper surface of the floor panel 16, an internal opening area gradually narrows outward in the vehicle width direction. In addition, a lower wall of the gusset plate 66 is also similarly inclined downward toward an outer side in the vehicle width direction. Accordingly, in a closed cross section formed by the gusset plate 66 and the lower surface of the floor panel 16, an internal opening area gradually widens outward in the vehicle width direction.

In the floor cross member 35, a central region in the vehicle width direction is formed to be lifted upward with respect to the side sills 14. However, in the floor cross member 35, according to the configuration, a closed cross section of a central region formed by the floor panel 16 and the cross plate 65 and an inclined closed cross section of the end region formed by the cross plate 65 and the gusset plate 66 are connected as a substantially constant cross-sectional area.

Figure 8:
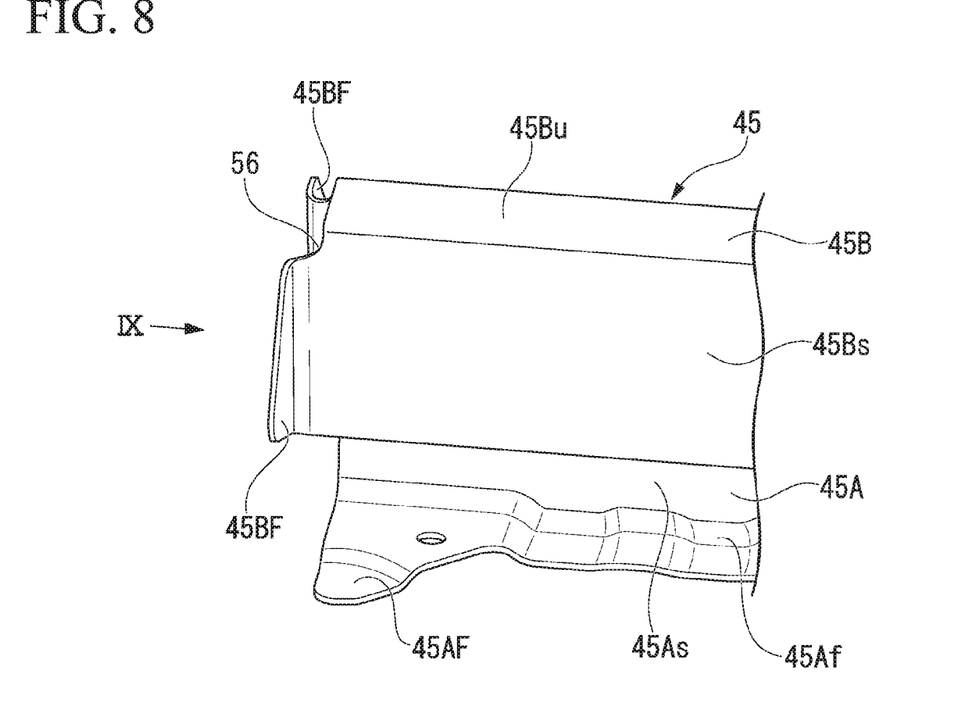
FIG. 8 is a perspective view of a battery cross member according to the embodiment of the present invention.
Figure 9:
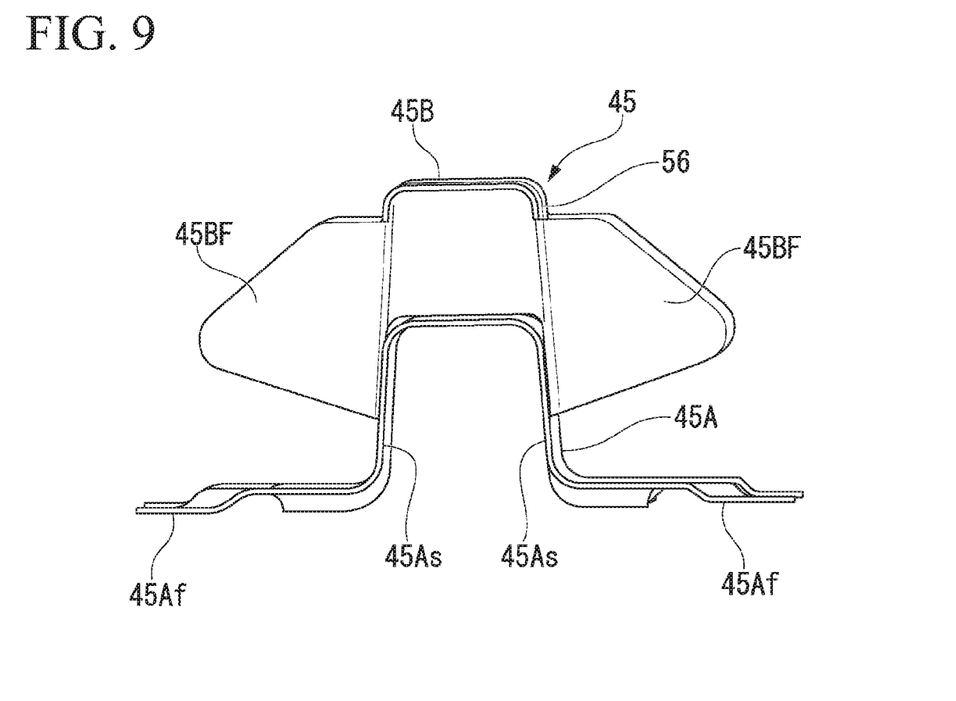
FIG. 9 is a view showing the battery cross member according to the embodiment of the present invention along an arrow IX in FIG. 8.
Figure 10:
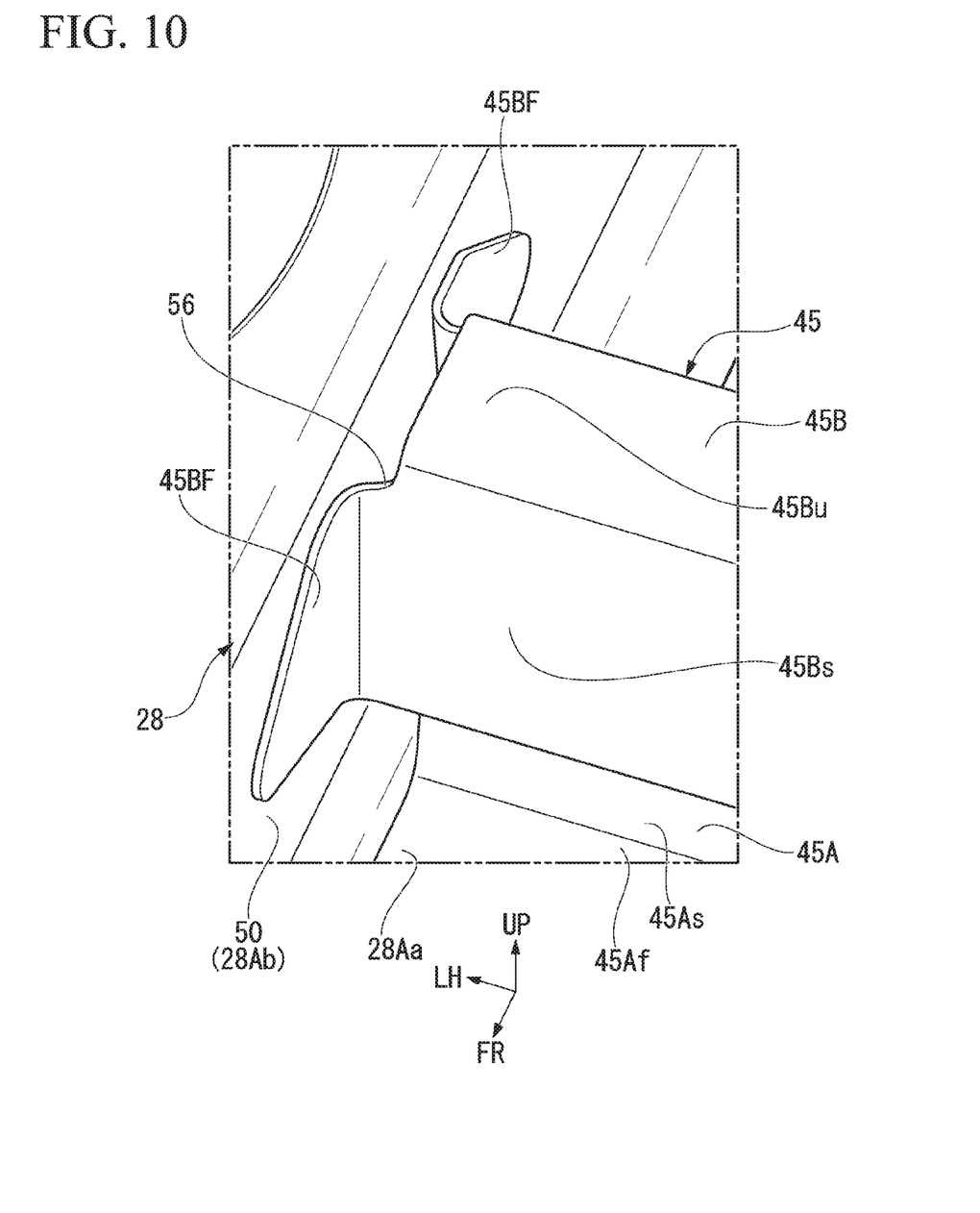
FIG. 10 is a perspective view showing a joining section between a second cross member and the battery pack according to the embodiment of the present invention.

FIG. 8 is a view showing the vicinity of the end portions of the battery cross members 45 in the vehicle width direction from a side obliquely above, and FIG. 9 is a view showing the battery cross members 45 taken along an arrow IX in FIG. 8. In addition, FIG. 10 is a view showing a joining section between the end portion of the battery cross member 45 and the sidewall 50 of the battery pack 28 from a side obliquely above.

The battery cross members 45 include a first cross member 45A having a substantially hat-shaped cross section extending substantially in the vehicle width direction, and a second cross member 45B having a substantially C-shaped cross section, extending substantially in the vehicle width direction and coupled integrally to the upper section of the first cross member 45A.

In the first cross member 45A, a base flange 45Af is continuously provided on lower ends of front and rear sidewalls 45As, and the base flange 45Af is joined to the upper surface of the bottom wall 28Aa of the battery pack 28 through welding or the like. In addition, as shown in FIG. 7, the first cross member 45A is formed to an extension length that does not reach the sidewalls 50 of the battery pack 28 (a length in the vehicle width direction) when the first cross member 45a is installed in the battery pack 28. However, as shown in FIG. 3 and FIG. 7, the first cross member 45A is formed to a length protruding further outward in the vehicle width direction from the battery cells 51 in the battery pack 28 when the first cross member 45A is installed in the battery pack 28.

In addition, first flange 45AF protruding from the front and rear sidewall 45As more than the base flange 45Af in the forward/rearward direction extends from the end portion of the first cross member 45A on outer side in the vehicle width direction. More specifically, the first flanges 45AF extending to be bent toward a front side of the vehicle body extend from a lower end of the sidewall 45As of the first cross member 45A on a front side, and the first flanges 45AF extending to be bent toward a rear side of the vehicle body extend from a lower end of the sidewall 45As of the first cross member 45A on a rear side. The first flanges 45AF are joined to an upper surface of the bottom wall 28Aa of the battery pack 28 through welding or the like.

In the second cross member 45B, lower edge portions of front and rear sidewalls 45Bs overlap outer surfaces of the front and rear sidewalls 45As of the first cross member 45A, and the sidewalls 45Bs and 45As are joined to each other through welding or the like in this state. In addition, the second cross member 45B has an extension length in the vehicle width direction that is set to be longer than an extension length of the first cross member 45A in the vehicle width direction. Further, an end portion of the second cross member 45B in the vehicle width direction joined to the first cross member 45A protrudes further outward in the vehicle width direction by a predetermined length L (see FIG. 3) than the end portion of the first cross member 45A in the vehicle width direction.

Second flange 45BF extending from the front and rear sidewall 45Bs to be bent in the vehicle body forward/rearward direction extends from end portion of the second cross member 45B on outer side in the vehicle width direction. More specifically, the second flange 45BF extending to be bent toward a front side of the vehicle body extends from the sidewall 45Bs of the second cross member 45B on a front side, and the second flange 45BF extending to be bent toward a rear side of the vehicle body extends from the sidewall 45Bs of the second cross member 45B on a rear side. The second flanges 45BF are joined to the inner surfaces of the sidewalls 50 of the battery pack 28 through welding or the like.

Further, as shown in FIG. 7, the first flanges 45AF of the first cross member 45A are formed to have an extension length in the vehicle body forward/rearward direction that is larger than that of the second flanges 45BF of the second cross member 45B.

A continuous notch section 56 is provided in portions of upper regions of the front and rear sidewalls 45Bs and an upper wall 45Bu among an edge of the second cross member 45B on an outer side in the vehicle width direction. Thus, when the notch section 56 is provided on the edge of the second cross member 45B on an outer side in the vehicle width direction, the vicinity of the base section of the second flange 45BF among the edge of the second cross member 45B on an outer side in the vehicle width direction is considered to be weak with respect to an input load. In the embodiment, a portion in which the notch section 56 is formed constitutes a weak section. When an impact load is input from a side of the vehicle body to an end portion of the second cross member 45B on an outer side in the vehicle width direction, the second cross member 45B is likely to be crushed and deformed around the notch section 56 of the end portion.

In addition, the first cross member 45A is constituted by a member having a strength that is higher than that of the second cross member 45B in the vehicle width direction. Specifically, the first cross member 45A is constituted by a metal plate having a thickness larger than that of the second cross member 45B. Further, the first cross member 45A may be constituted by a member formed of a material having a higher strength than that of the second cross member 45B.

Figure 11:
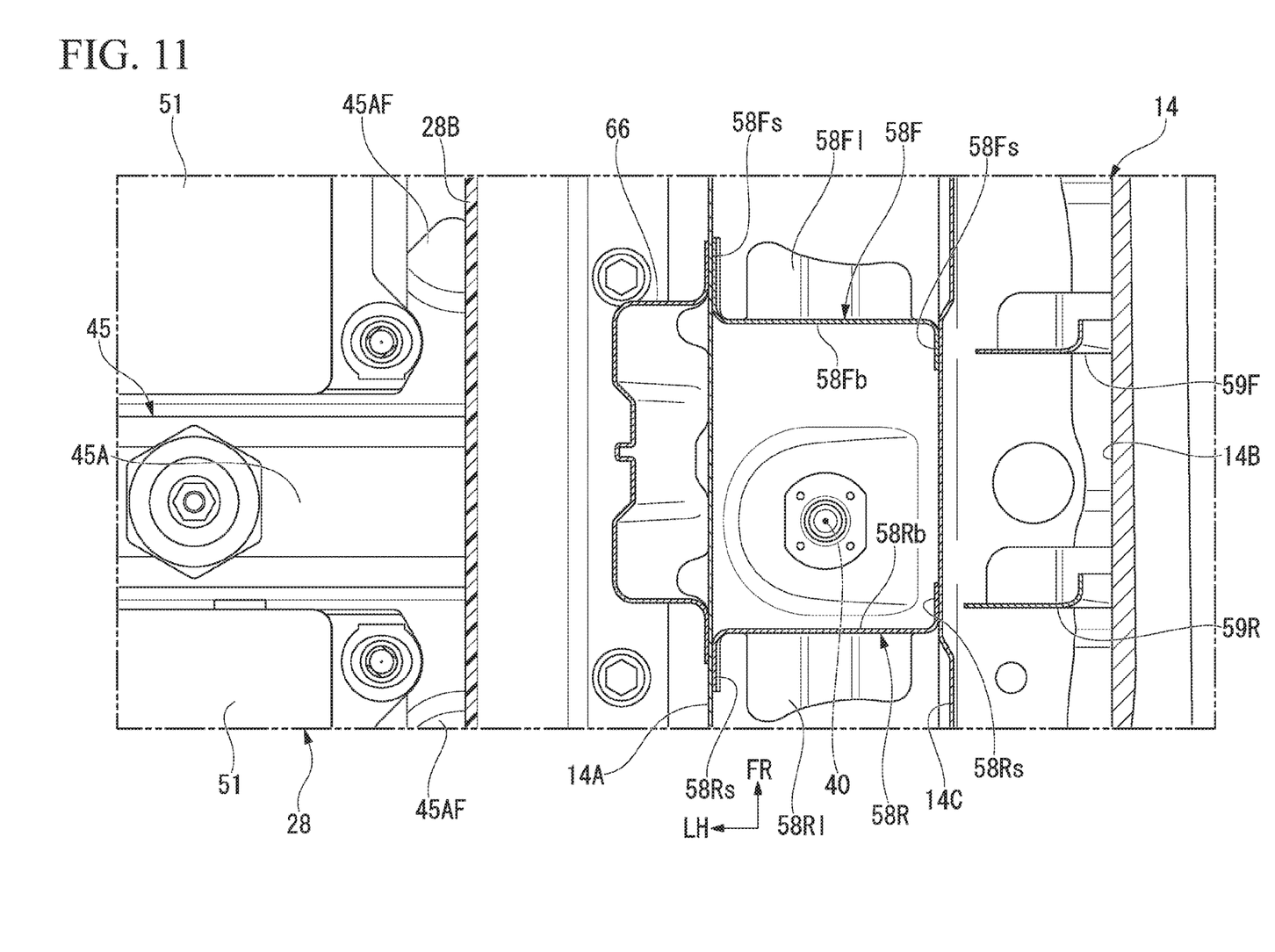
FIG. 11 is a cross-sectional view of the vehicle body lower structure according to the embodiment of the present invention taken along line XI-XI in FIG. 3.

FIG. 11 is a view showing a cross section of the vehicle body lower structure of the embodiment taken along line XI-XI in FIG. 3.

As shown in FIG. 3, FIG. 4, FIG. 6 and FIG. 11, the side sills 14 disposed at side portions of the vehicle body are configured by sandwiching a stiffener 14C between a side sill inner portion 14A and a side sill outer portion 14B having a hat-shaped cross section. The side sill inner portion 14A includes upper and lower joining flanges 14Aa and 14Ab, and an inner protruding section 14Ac having a substantially C-shaped cross section and protruding from base sections of the joining flanges 14Aa and 14Ab toward an inner side in the vehicle width direction. The side sill outer portion 14B includes upper and lower joining flanges 14Ba and 14Bb, and an outer protruding section 14Bc having a substantially C-shaped cross section and protruding from base sections of the joining flanges 14Ba and 14Bb toward an outer side in the vehicle width direction. The stiffener 14C is formed in a flat plate shape, and coupled to the upper and lower joining flanges 14Aa, 14Ba, 14Ab and 14Bb of the side sill inner portion 14A and the side sill outer portion 14B through welding or the like in a state in which the stiffener 14C is interposed between the side sill inner portion 14A and the side sill outer portion 14B. The inside of the side sill 14 is partitioned into an inner closed space 67 and an outer closed space 68 by the stiffener 14C, and the cross section is reinforced by the stiffener 14C.

Further, the fixing points 40 of the side sills 14 to the battery pack 28 (a fastening section by the bolt 54 and the nut 55) is disposed on a lower wall 14Ac1 of the side sill inner portion 14A (the lower wall 14Ac1 of the inner protruding section 14Ac) facing the inner closed space 67.

A first inner bulkhead 58F and a second inner bulkhead 58R are disposed in the inner closed space 67 of the side sills 14 while having the fixing points 40 to the battery pack 28 sandwiched there between in the front and rear sides (front and rear sides in the vehicle body forward/rearward direction). In the embodiment, the first inner bulkhead 58F and the second inner bulkhead 58R constitute a bulkhead configured to reinforce the cross section of the side sills 14 from the inside.

In the first inner bulkhead 58F, an upper flange 58Fu, a lower flange 58Fl and inner and outer side flanges 58Fs in the vehicle width direction extend to be bent at a substantially right angle from an outer edge portion of a bulkhead main body 58Fb configured to partition the inner closed space 67 into front and rear sections in front of the fixing points 40. The upper flange 58Fu is joined to an upper wall 14Acu of the inner protruding section 14Ac of the side sill inner portion 14A, and the lower flange 58Fl is joined to the lower wall 14Ac1 of the inner protruding section 14Ac of the side sill inner portion 14A. In addition, the inner and outer side flanges 58Fs in the vehicle width direction are joined to the inner side surface of the stiffener 14C and the sidewall 14Acs of the inner protruding section 14Ac.

Similarly, in the second inner bulkhead 58R, an upper flange 58Ru, a lower flange 58Rl and inner and outer side flanges 58Rs in the vehicle width direction extend to be bent at a substantially right angle from an outer edge portion of a bulkhead main body 58Rb configured to partition the inside of the inner closed space 67 into front and rear parts on a rear side of the fixing points 40. The upper flange 58Ru is joined to the upper wall 14Acu of the inner protruding section 14Ac of the side sill inner portion 14A, and the lower flange 58Rl is joined to the lower wall 14Ac1 of the inner protruding section 14Ac of the side sill inner portion 14A. The inner and outer side flanges 58Rs in the vehicle width direction are joined to the inner side surface of the stiffener 14C and the sidewall 14Acs of the inner protruding section 14Ac, respectively.

In addition, a first outer bulkhead 59F and a second outer bulkhead 59R are disposed in the outer closed space 68 of the side sills 14. The first outer bulkhead 59F and the second outer bulkhead 59R are joined to the outer protruding section 14Bc of the side sill outer portion 14B and the stiffener 14C at outer positions in the vehicle width direction of the first inner bulkhead 58F and the second inner bulkhead 58R in the inner closed space 67. Accordingly, the first outer bulkhead 59F and the second outer bulkhead 59R reinforce front and rear positions of the fixing points 40 in the side sills 14 together with the first inner bulkhead 58F and the second inner bulkhead 58R. In the embodiment, the first outer bulkhead 59F and the second outer bulkhead 59R constitute an outer bulkhead.

Further, the fixing points 40 on the side sills 14 and the first inner bulkhead 58F and the second inner bulkhead 58R disposed in front of and behind the fixing points 40 are disposed on an outer position of the gusset plate 66 (the connecting member) in the vehicle width direction that constitutes a part of the floor cross member 35.

In the above-mentioned configuration, when an impact load is input to the side sills 14 from a side of the vehicle body, the impact load is transmitted to the sidewalls 50 in the battery pack 28 from the fixing points 40 of the side sills 14 through the side frame 52 and the attachment frame 53. The impact load transmitted to the sidewalls 50 is transmitted to a central region in the vehicle width direction through the second cross member 45B and the first cross member 45A of the battery cross members 45. Here, the second cross member is crushed and deformed first, and energy of an impact load is absorbed during crush deformation. In addition, when the second cross member is deformed to a predetermined amount or more in the vehicle width direction, the second cross member 45B restricts crush deformation of the first cross member 45A to the predetermined amount or more. As a result, the battery cells 51 in the battery pack 28 are protected.

As described above, in the vehicle body lower structure of the embodiment, the first inner bulkhead 58F and the second inner bulkhead 58R are installed at front and rear positions on the vehicle body and inside the side sills 14 while having the fixing points 40 of the side sills 14 to the battery pack 28 sandwiched between the front and rear positions. For this reason, the cross section at the front and rear positions of the fixing points 40 of the side sills 14 to the battery pack 28 is reinforced the cross section by using the first inner bulkhead 58F and the second inner bulkhead 58R, and rigidity of the front and rear positions on the fixing points 40 is largely increased. Accordingly, when the vehicle body lower structure of the embodiment is employed, since deformation of the side sills 14 in the vicinity of the fixing points 40 of the battery pack 28 can be suppressed, vehicle body vibrations due to rocking of the battery pack 28 that is a heavy article can be suppressed.

In addition, in the vehicle body lower structure of the embodiment, since both end portions of the battery pack 28 in the vehicle width direction are supported by the side sills 14 with high rigidity, rigidity of the vehicle body below the floor panel 16 can be increased by the battery pack 28 itself. In the vehicle 10 of the embodiment, since the battery pack 28 is disposed immediately below the floor panel 16, a dedicated cross member configured to reinforce the floor panel 16 cannot be installed on the lower surface of the floor panel 16. However, in the vehicle 10 of the embodiment, since rigidity below the floor panel 16 can be increased by the battery pack 28 itself, a decrease in rigidity of the vehicle body below the floor panel 16 can be suppressed.

In addition, in the vehicle body lower structure of the embodiment, the first inner bulkhead 58F and the second inner bulkhead 58R are fixed to an upper wall Acu and a lower wall Acl of the inner protruding section 14Ac of the side sills 14 at the upper flanges 58Fu and 58Ru and the lower flanges 58F1 and 58R1. For this reason, rigidity of the side sills 14 in the vicinity of the fixing points 40 to the battery pack 28 in the upward/downward direction can be increased by the first inner bulkhead 58F and the second inner bulkhead 58R. Accordingly, when the configuration is employed, vertical vibrations of the battery pack 28 that is a heavy article can be efficiently suppressed.

In addition, in the vehicle body lower structure of the embodiment, the gusset plate 66 that constitutes a part of the floor cross member 35 is connected to the lower surface of the floor panel 16 and the side surfaces of the side sills 14 on an inner side in the vehicle width direction, and the fixing points 40 of the side sills 14, the first inner bulkhead 58F and the second inner bulkhead 58R are disposed at outer positions on the gusset plate 66 in the vehicle width direction. For this reason, the fixing points 40 of the side sills 14 are also reinforced by the gusset plate 66 that is the connecting member as well as the first inner bulkhead 58F and the second inner bulkhead 58R disposed in front of and behind the fixing points 40. Accordingly, in the case in which the configuration is employed, when an impact load is input from the side sill 14 on an outer side in the vehicle width direction, a load can be efficiently transmitted to the floor panel 16 side via the first inner bulkhead 58F, the second inner bulkhead 58R and the gusset plate 66 while suppressing deformation of the cross section of the side sills 14.

Further, in the vehicle body lower structure of the embodiment, the stiffener 14C configured to partition the inside of the side sills 14 into the inner closed space 67 and the outer closed space 68 and reinforce them, is provided and the fixing points 40 of the side sills 14, the first inner bulkhead 58F and the second inner bulkhead 58R are disposed in the inner closed space 67. For this reason, since surroundings of the fixing points 40 of the side sills 14 are efficiently reinforced by the stiffener 14C, the first inner bulkhead 58F and the second inner bulkhead 58R, rigidity in the vicinity of the fixing points 40 of the side sills 14 can be further increased. Accordingly, when the configuration is employed, vibrations of the vehicle body can be further suppressed.

In addition, in the vehicle body lower structure of the embodiment, the first outer bulkhead 59F and the second outer bulkhead 59R are disposed in the outer closed space 68 partitioned by the stiffener 14C. According to the configuration, since the outer closed space 68 in the side sills 14 can be reinforced by the first outer bulkhead 59F and the second outer bulkhead 59R, rigidity in the vicinity of the fixing points 40 of the side sills 14 can be further increased.

In particular, in the case of the embodiment, the first outer bulkhead 59F and the second outer bulkhead 59R are provided at front and rear positions on the vehicle body and inside the outer closed space 68 while having the fixing points 40 sandwiched between the front and rear positions. For this reason, the front and rear positions of the fixing points 40 in the side sills 14 are reinforced by the first outer bulkhead 59F and the second outer bulkhead 59R as well as the first inner bulkhead 58F and the second inner bulkhead 58R. Accordingly, when the configuration is employed, rigidity in front of and behind the fixing points 40 in the side sills 14 can be further increased, and deformation in the vicinity of the fixing points 40 of the side sills 14 can be further suppressed.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle body lower structure comprising:
a pair of left and right side sills disposed below a side portion of a vehicle body and extending substantially in a vehicle body forward/rearward direction;
a battery pack configured to accommodate a battery cell therein and having both end portions in a vehicle width direction fixed to the side sills while being disposed below a floor panel; and
bulkheads disposed inside of the side sills and configured to reinforce a cross section of the side sills from inside, wherein the bulkheads are provided at front and rear positions on the vehicle body and inside the side sills while having fixing points of the side sills to the battery pack sandwiched between the front and rear positions, wherein a connecting member configured to connect a lower surface of the floor panel and a side surface of the side sills on an inner side in the vehicle width direction is provided, and wherein the fixing points of the side sills to the battery pack and the bulkheads are disposed at positions on the connecting member on an outer side in the vehicle width direction.

2. The vehicle body lower structure according to claim 1, wherein the bulkheads are fixed to an inside of the side sills at least in an upward/downward direction.

3. The vehicle body lower structure according to claim 1, wherein a stiffener configured to partition the inside of the side sill into a closed space on an inner side in the vehicle width direction and a closed space on an outer side in the vehicle width direction and reinforce them is disposed in the side sills, and the bulkheads and the fixing points are disposed in an inner closed space partitioned by the stiffener on an inner side of the side sills.

4. The vehicle body lower structure according to claim 3, wherein an outer bulkhead configured to reinforce an outer closed space from inside is disposed in the outer closed space partitioned by the stiffener on an inner side of the side sills.

5. The vehicle body lower structure according to claim 4, wherein the outer bulkheads are provided at the front and rear positions on the vehicle body and inside the outer closed space while having the fixing points sandwiched between the front and rear positions.

6. A vehicle body lower structure comprising:
a pair of left and right side sills disposed below a side portion of a vehicle body and extending substantially in a vehicle body forward/rearward direction;
a battery pack configured to accommodate a battery cell therein and having both end portions in a vehicle width direction, fixed to the side sills while being disposed below a floor panel; and
bulkheads disposed inside of the side sills and configured to reinforce a cross section of the side sills from inside, wherein the bulkheads are provided at front and rear positions on the vehicle body and inside the side sills while having fixing points of the side sills to the battery pack sandwiched between the front and rear positions, wherein a stiffener configured to partition the inside of the side sills into a closed space on an inner side in the vehicle width direction and a closed space on an outer side in the vehicle width direction and reinforce them is disposed in the side sills, and wherein the bulkheads and the fixing points are disposed in an inner closed space partitioned by the stiffener on an inner side of the side sills.

7. The vehicle body lower structure according to claim 6, wherein an outer bulkhead configured to reinforce an outer closed space from inside is disposed in the outer closed space partitioned by the stiffener on an inner side of the side sills.

8. The vehicle body lower structure according to claim 7, wherein the outer bulkheads are provided at the front and rear positions on the vehicle body and inside the outer closed space while having the fixing points sandwiched between the front and rear positions.

* * * * *